UnitedStates Patent Office 2,726,211
Patented Dec. 6, 1955

2,726,211

HEAT STORAGE MATERIALS

Vincent J. Schaefer, Schenectady, N. Y., assignor to General Electric Company, a corporation of New York No Drawing. Application April 29, 1953,
Serial No. 349,985

2 Claims. (Cl. 252—70)

This invention relates to heat storage materials particularly of the type serving as a heat reservoir from which heat may be drawn as needed for space heating. Such heat reservoirs are important in heat pump installations and other heating arrangements.

A heat storage reservoir consists of a well insulated tank containing a fluid circulating coil on the interior thereof surrounded by heat storage material. The nature of the heat storage material depends upon the service requirements to be met. In many cases, water is a satisfactory heat storage material. However, for space heating purposes the heat content of liquid water is insufficient and the melting point of water is too low to make use of the heat of fusion. For use in space heating reservoirs, certain materials having melting points within the range of 90° F. to 130° F. are more satisfactory than water. Certain inorganic salts which do not undercool seriously and remain as a two-phase system are satisfactory for this purpose.

It is an object of this invention to provide an organic heat storage material having a melting point, or solidification point, within the range considered desirable for heat storage material.

It is another object of this invention to provide an organic heat storage material which does not undercool or supercool to a serious extent.

Briefly stated, in accordance with one of its aspects, this invention is directed to a heat storage material comprising a mixture of oleic and stearic acids in which stearic acid is present to the extent of 30% to 90% by weight. In addition to this binary system, the invention is also directed to a ternary system in which diphenyl ether is present along with the stearic and oleic acids.

Stearic acid melts at 154° F. Commercial oleic acid melts at a temperature below 57° F. I have found that mixtures of these two substances in which stearic acid is present to the extent of 30% to 90% by weight have a melting point within the range which makes them desirable for use as heat storage liquids which do not undercool. Technical grades of these materials may be used in which event the small quantities of impurities present have the effect of lowering the melting point slightly. I prefer a mixture of about equal portions by weight of each acid and have found that such a mixture solidifies at 116° F. without supercooling. However, the proportions may vary widely. For example, a mixture of 85% by weight stearic acid to 15% by weight oleic acid solidifies at 130° F. A mixture of 30% stearic—70% oleic acids by weight solidifies at 93° F.

Where it is desired to lower the solidification point below that obtainable from a binary mixture diphenyl ether may be added as a third component. The addition of 5% to 15% by weight of diphenyl ether will lower the solidification point of the stearic-oleic acid mixtures by from 20° F. to 35° F. A satisfactory ternary mixture contains 5% to 15% by weight diphenyl ether and 30% to 50% by weight oleic acid, the balance consisting of stearic acid. A preferred heat storage material within this range consists of approximately 10% by weight diphenyl ether, 40% by weight oleic acid, and 50% by weight stearic acid. This mixture solidifies at 95° F. without supercooling. No special precautions need be observed in preparing these mixtures. They are merely weighed in the correct proportions and mixed. They are then ready for use.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A heat storage material consisting essentially of 5% to 15% by weight diphenyl ether and 30% to 50% by weight oleic acid, the balance consisting of stearic acid.

2. A heat storage material comprising approximately 10% by weight diphenyl ether, 40% by weight oleic acid, and 50% by weight stearic acid.

References Cited in the file of this patent

UNITED STATES PATENTS

| | | |
|---|---|---|
| 679,972 | Kyle | Aug. 6, 1901 |
| 735,941 | Burwell | Aug. 11, 1903 |

OTHER REFERENCES

Chem. Society Journal (1939), pp. 974–980.

J. Soc. Chem. Ind. Japan 37, Suppl. binding (1934), p. 195.